UNITED STATES PATENT OFFICE.

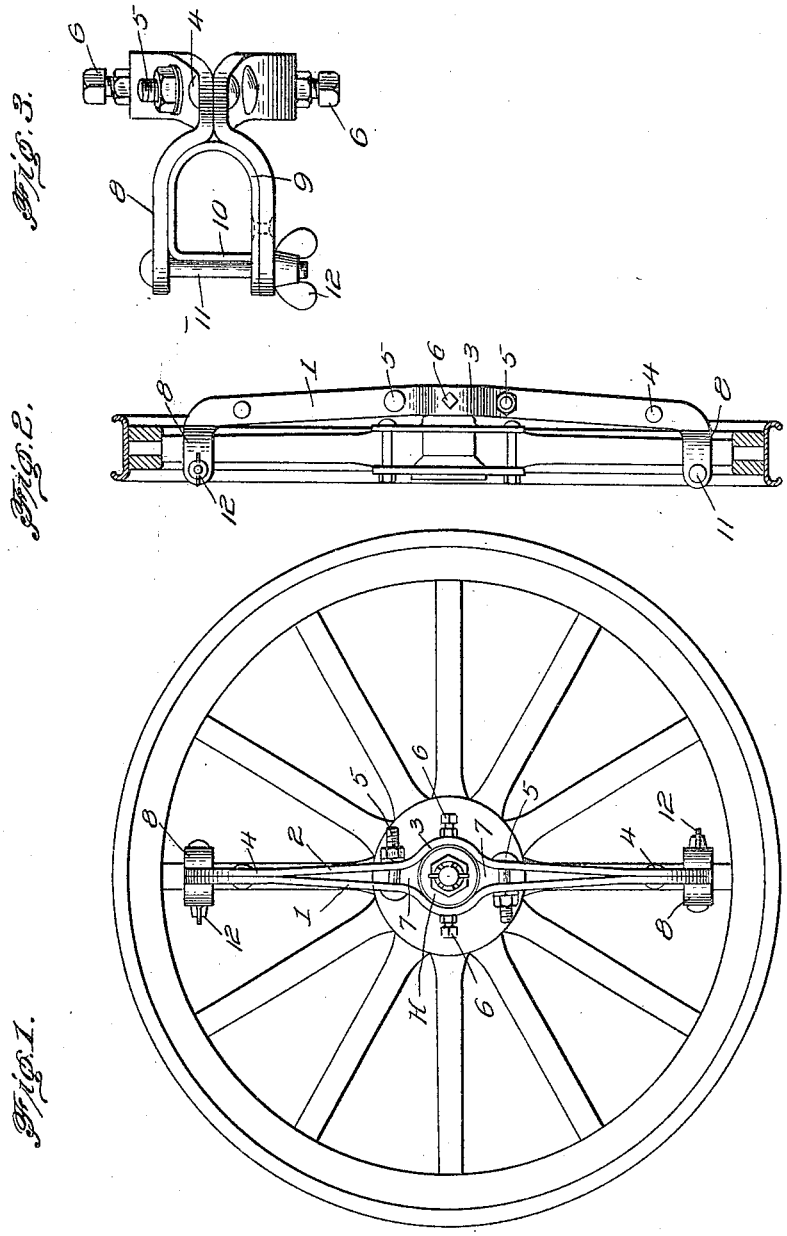

HAROLD N. ROOK AND FRANK M. PAYN, OF FRIENDSHIP, WISCONSIN.

EMERGENCY REPAIR HUB FOR AUTOMOBILES.

1,407,675. Specification of Letters Patent. Patented Feb. 21, 1922.

Application filed September 13, 1921. Serial No. 500,280.

*To all whom it may concern:*

Be it known that we, HAROLD N. ROOK and FRANK M. PAYN, citizens of the United States, residing at Friendship, in the county of Adams and State of Wisconsin, have invented certain new and useful Improvements in Emergency Repair Hubs for Automobiles, of which the following is a specification.

This invention relates to emergency repair hubs for automobiles.

One object of the invention is to provide a simple device of this character which may be used on hubs of various sizes and which is especially designed for use in connection with Ford cars.

Another object is to provide a device of this character which may be carried in a tool box and when needed can be applied in about five minutes being so constructed as to effectively hold the wheel on and brace it.

Another object is to provide a device of this character which is simple and strong and will turn the wheel on any Ford car either forward or rearward and which is constructed to insure a tight fit as well as to provide a strong and rigid wheel brace.

With these and other objects in view, the invention consists in certain novel features of construction as hereinafter shown, described and claimed.

In the accompanying drawing:—

Figure 1 represents a side elevation of the car wheel with this improved hub shown applied, Figure 2 is a side elevation of the hub with the wheel shown in section, and Figure 3 is an end elevation of the hub.

In the embodiment illustrated, a wheel W is shown which is as usually employed on Ford cars in connection with which this improved emergency repair hub is designed to be used.

The device constituting this invention comprises a pair of metal bars 1 and 2 bowed outwardly in opposite directions midway their ends at diametrically opposite points said bowed portions 3 being designed to form the auxiliary hub which embraces the broken hub of the wheel. These bars 1 and 2 are riveted together near their opposite ends as shown at 4 and are equipped with clamping bolts 5 adjacent the bowed portions 3 thereof said bolts being operable to tighten up the hub around the broken wheel hub by turning the nuts on said bolts. The hub encircling outwardly bowed portions 3 are also equipped with set screws 6 which are designed to engage the broken wheel hub H to prevent its turning inside the auxiliary hub.

The outwardly bowed portions 3 of the auxiliary hub are arcuate rather than semi-circular so that they do not completely encircle the broken wheel hub H leaving a space 7 at their ends which insures a tight fit when the clamping bolts 5 are tightened up and the diverging bars 1 and 2 provide a strong and rigid wheel brace.

The bars 1 and 2 beyond their points of connection have their ends extended laterally in contact with each other and then bow outwardly in opposite directions to provide a stirrup like clamp for encircling one of the spokes S of the wheel in connection with which the device is to be used. These clamps 8 are leather lined as shown at 9 the lining strips being secured by riveting or otherwise within the stirrup and the end of said strip shown at 10 being loose and extended laterally across the stirrup in contact with the bolt 11 which is used for clamping the side bars or members of the stirrup in clamping engagement with the spoke. The bolts 11 are preferably equipped with wing nuts 12 so that they may be tightened or loosened by hand without requiring the use of a tool.

This emergency hub is preferably constructed of soft steel which is tough and durable and it may be finished in any desired manner the leather linings in the spoke clamps operating to protect the spokes against marring.

In the use of this device when the wheel hub is broken the first thing to be done is to remove the hub cap from the broken hub then remove the clamp bolts 11 from the spoke clamping stirrups 8 and turn the free ends of the leather linings outward and also turn the set screws 6 back flush with the inside circle of the auxiliary hub and place the center of said hub over the outside of the broken hub with the U-shaped spoke clamping ends directly over opposite spokes, then force the hub onto the wheel hub until it rests tightly against the outside flange on the wheel. Then return the ends of the leather lining strips 9 back against the spokes and replace the clamping bolts 11 together with lock washers and thumb nuts turning the same up snugly with the thumb and finger. The clamping bolts 5 are then tightened by a wrench until the outwardly bowed hub portions 3 snugly fit the broken wheel hub adapting the two to operate as a unitary structure. The set screws 6 are then tightened and the wheel is ready for use.

From the above description it will be obvious that this auxiliary hub may be quickly applied and removed and is of such a size that it may be readily carried in the tool box of a car avoiding the necessity when a wheel hub breaks of walking or telephoning to obtain the assistance of a mechanic then possibly having to wait several hours in addition to paying heavily for the work of a mechanic.

The preferred embodiment of the invention is disclosed in the drawing and set forth in the specification, but it will be understood that any modifications within the scope of the claimed invention may be made in the construction without departing from the principle of the invention or sacrificing any of its advantages.

We claim—

1. An emergency repair hub comprising hub clamping members having converging longitudinal extensions carrying spoke engaging elements, said members being equipped with means for tightly clamping them to the wheel hub.

2. An emergency repair hub comprising hub clamping members having diametrically opposite pairs of converging longitudinal extensions carrying spoke engaging elements, and gripping bolts passing through said extensions for tightening said hub clamping members around the wheel hub.

3. An emergency repair hub comprising a pair of bars having outwardly bowed wheel hub engaging members intermediate their ends, said bars converging beyond said bowed portions and contacting near their outer ends and secured together the ends of said bars being provided with laterally extending spoke engaging elements, and gripping bolts passing through the bars adjacent the bowed portions thereof for tightening said portions around the wheel hub.

4. An emergency repair hub comprising a pair of bars having outwardly bowed wheel hub engaging members intermediate their ends, said bars converging beyond said bowed portions and contacting near their outer ends and secured together the ends of said bars being provided with laterally extending spoke engaging elements, and gripping bolts passing through the bars adjacent the bowed portions thereof for tightening said portions around the wheel hub, the bowed portions of said bars being each provided with a set screw for engaging the wheel hub in connection with which the device is to be used.

5. An emergency repair hub comprising a pair of bars having outwardly bowed wheel hub engaging members intermediate their ends, said bars converging beyond said bowed portions and contacting near their outer ends and secured together the ends of said bars being provided with laterally extending spoke engaging elements, and gripping bolts passing through the bars adjacent the bowed portions thereof for tightening said portions around the wheel hub, the spoke engaging elements being equipped with gripping bolts to securely clamp them to the spokes.

In testimony whereof, we affix our signatures hereto.

HAROLD N. ROOK.
FRANK M. PAYN.